Dec. 26, 1922.  
A. F. CASE.  
CAR DUMPER.  
ORIGINAL FILED AUG. 15, 1919.  
1,439,866  
6 SHEETS-SHEET 1

Fig. 1.

Inventor  
Arthur F. Case  
By  
Thurston Knox & Hudson  
attys Patented Dec. 26, 1922.

1,439,866

UNITED STATES PATENT OFFICE.

ARTHUR F. CASE, OF CLEVELAND, OHIO, ASSIGNOR TO THE WELLMAN-SEAVER-MORGAN COMPANY, OF CLEVELAND, OHIO, A CORPORATION OF OHIO.

CAR DUMPER.

Application filed August 15, 1919, Serial No. 317,711. Renewed November 11, 1922. Serial No. 600,471.

*To all whom it may concern:*

Be it known that I, ARTHUR F. CASE, a citizen of the United States, residing at Cleveland, in the county of Cuyahoga and State of Ohio, have invented a certain new and useful Improvement in a Car Dumper, of which the following is a full, clear, and exact description.

This invention relates to a car dumper of the rolling cradle type, that is to say, with a cradle or barrel which is designed to receive a car and to be turned or rolled over a support to dump the car.

One of the objects of the invention is to provide a car dumper capable of handling regulation cars which convey coal and the like, and which is lighter in construction, simpler and less expensive to install, and requires less power to operate it than the ordinary dumper having a pivoted cradle.

Further, the invention aims to provide a construction which lends itself to the duplication or multiplication of cradles for handling a plurality of cars at one time without introducing the structural difficulties incident to the use of a single cradle which handles and dumps two or more cars at the same time.

Another object is to provide a dumper of the type stated which is capable of dumping the contents of one or more cars at either side of the approach track, thus allowing for greater receiving bin capacity than ordinarily prevails.

A still further object is to provide a cradle turning or rolling mechanism which gives positive control for the actuation of the cradle, at any position of the latter with a minimum of flexibility and lost play such as result from the use of ropes and equivalent means for turning a cradle of this type.

A still further object is to provide, in connection with the rolling cradle a series of car clamps which are automatic in action, and which clamp the car at the start of the movement from normal position and releases the car just as the cradle is restored to normal or car receiving position.

The invention may be briefly summarized as consisting in certain novel combinations and arrangements of parts and details of construction which will be described in the specification and set forth in the appended claims.

In the accompanying sheets of drawings.

Figure 1:
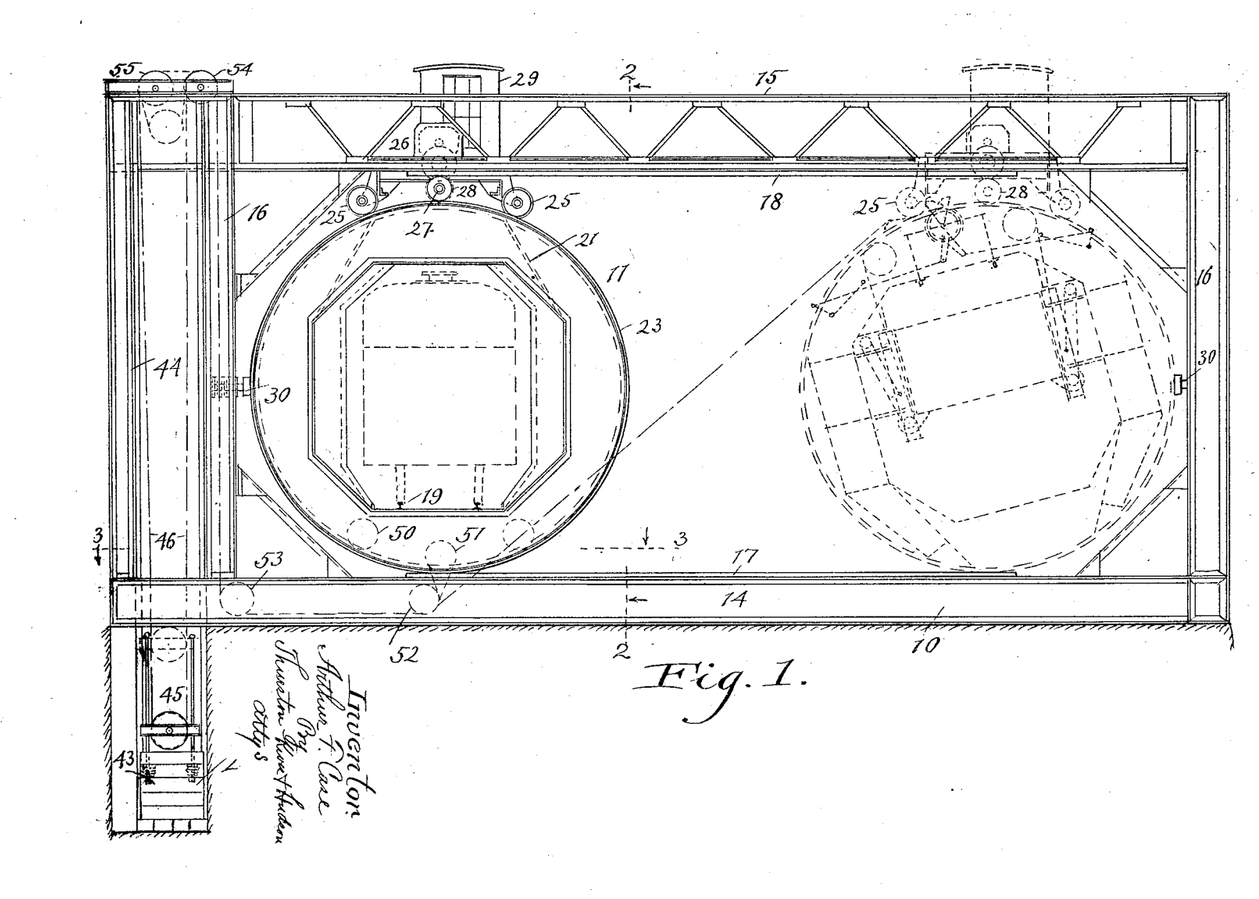
Fig. 1 is an end elevation of a car dumper embodying my invention, the cradle of the dumper in this instance adapted to be rolled in one direction only from normal position.
Figure 7:
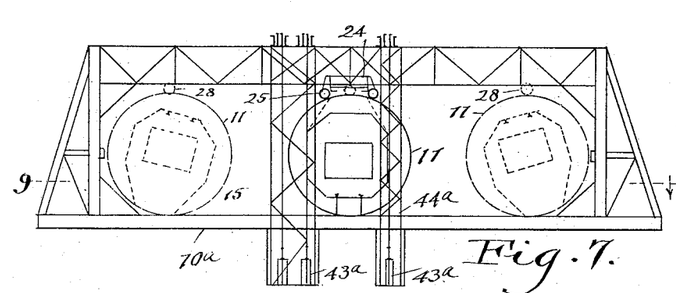
Figs. 7, 8 and 9 are respectively an end elevation, side elevation, and a section along the line 9—9 of Fig. 7 showing diagrammatically a dumper having a pair of cradles which are designed to be rolled in both directions from normal position so as to dump the contents of the car or cars at either side of the approach track.

The car dumper involving my invention is provided with a main frame 10 which is stationary, this frame being rectangular in contour and open from side to side so that the cradle 11 may roll either in one direction from normal position, as shown in Fig. 1 where the normal or car receiving position is shown in full lines, and the dumping position by dotted lines, or in both directions from normal, as shown in Fig. 7, where again the cradle is shown by full lines in normal or car receiving position at the middle of the frame, and by dotted lines in both dumping positions at the right and left of normal position. Suitable bins or other receiving means will be provided to receive the material dumped from the cars, and in the event the cradle is designed to roll in one direction only, the bins or receiving means will be provided beneath the frame 10 at one side of the approach track, and if the cradle is designed to be rolled in both directions from normal position the receiving means will be provided beneath the frame on both sides of the approach track.

Figure 2:
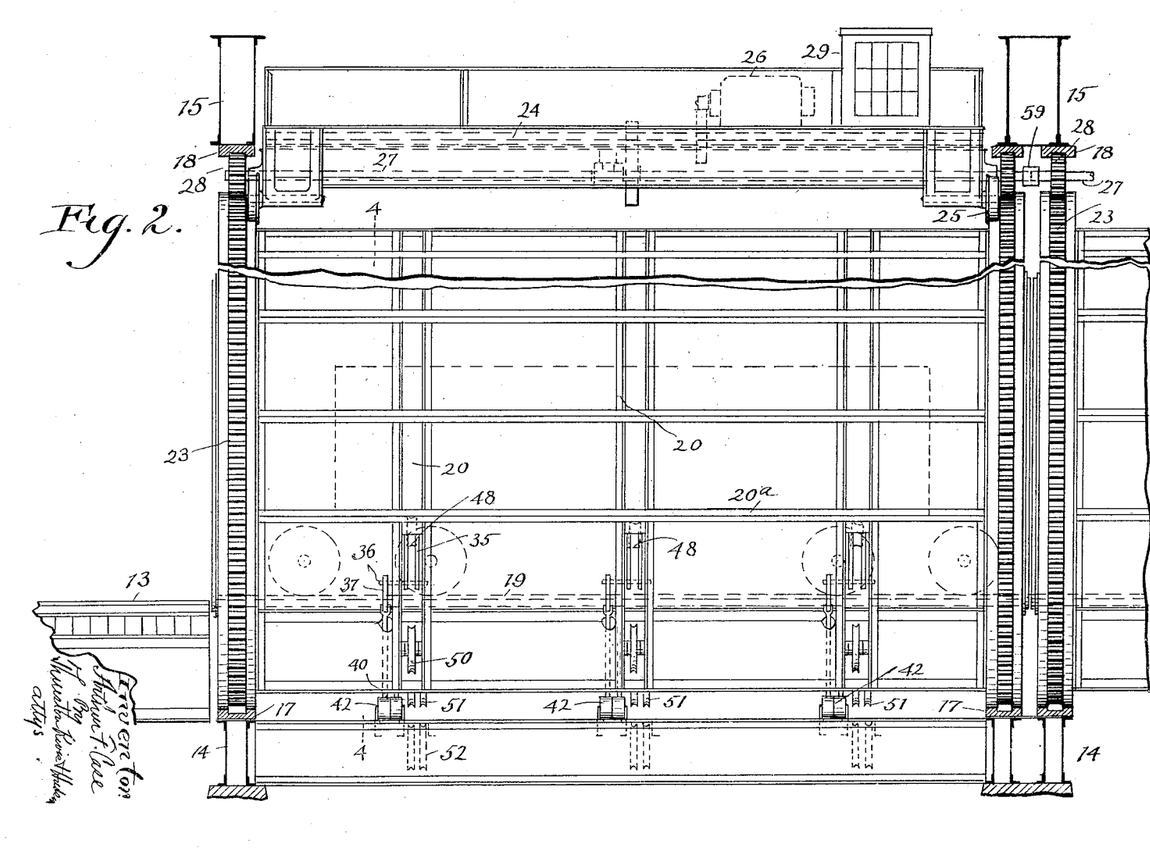
Fig. 2 is a section substantially along the line 2—2 on Fig. 1 illustrating the manner in which the multiple unit cradle feature may be employed.
Figure 3:
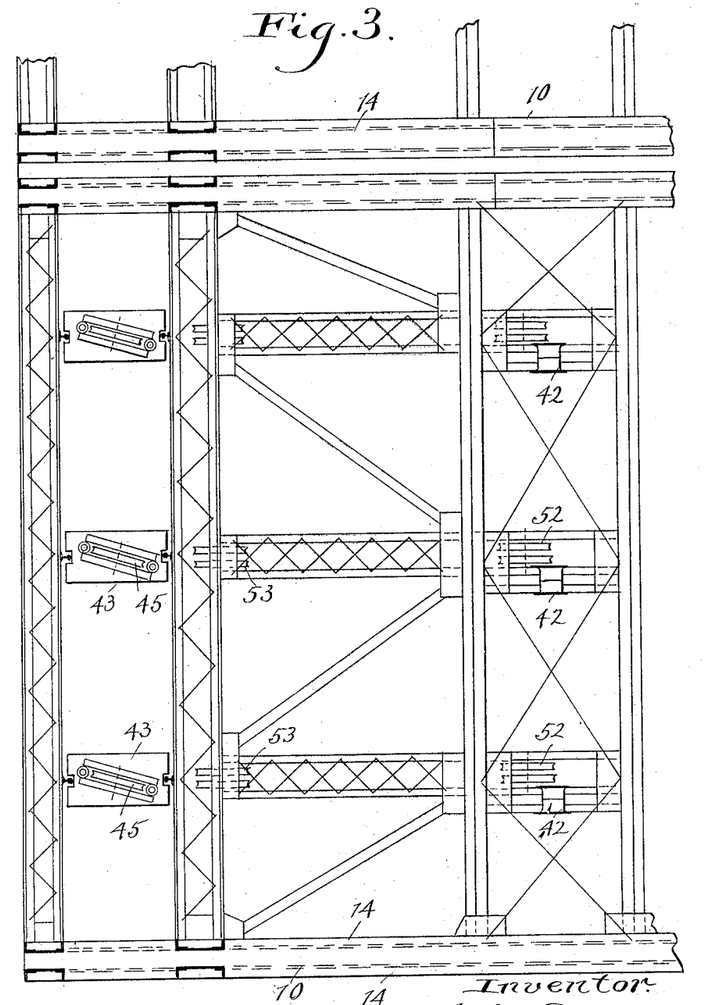
Fig. 3 is a fragmentary sectional plan view substantially along the lines 3—3 of Fig. 1.

In Fig. 2 the approach track is indicated at 13 this track extending up to the frame 10 near one end thereof, in the event the cradle rolls in one direction from normal position, and approaching or extending up to the frame 10 at the middle thereof in the event the cradle rolls in both directions from normal position.

The frame 10 is formed of structural material, and may be constructed to accommodate either a single cradle or two or more cradles designed to be simultaneously turned or rolled, in which event the latter will of course be arranged end to end so that two or more cars can be simultaneously run into the cradles or removed therefrom, and also dumped simultaneously. Each frame unit or the frame for each cradle is preferably composed of lower girders 14, upper girders 15, and upright side beams or columns 16, and in addition suitable structural parts to form a rigid construction. If the dumper is the multiple unit type the frame will be in one unitary structure, although the different units will be alike in construction.

Each frame unit is provided at the bottom directly above the lower end girders 14 with racks 17, and each frame unit is provided at the top along the lower sides of the upper girders 15 with racks 18, these racks being utilized in turning the cradle, and the lower racks serving in addition as supports for the cradle. Each rack is shrouded, being provided with rack teeth at the center and rolling or bearing surfaces at each side.

Figures 4, 5, 6:
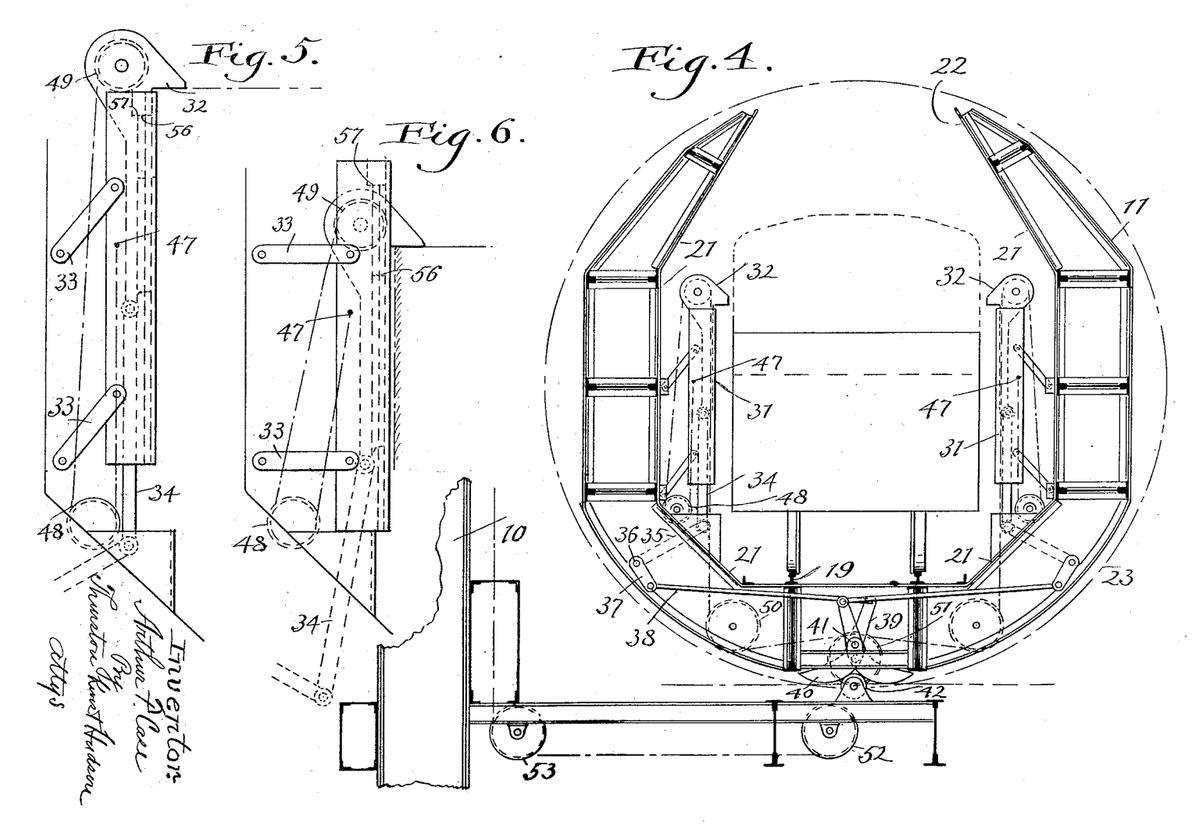
Fig. 4 is a section substantially along the line 4—4 of Fig. 2, showing particularly the car clamps and operating mechanism therefor.
Figs. 5 and 6 are enlarged views of one of the car clamps, Fig. 5 showing the clamp in normal or released position, and Fig. 6 showing it in clamping position.

Taking up next the construction of the cradle, the cradle is in the form of a rolling structure, cylindrical in contour when viewed from the end and substantially cylindrical when viewed from the side, the cradle being open from end to end so that a car can be run into the cradle from one end and removed from the opposite end, the length of the cradle being somewhat greater than the length of the longest car to be handled. At the bottom of the inside of the cradle are track rails 19 on which the car runs, these rails aligning with rails 13 of the approach track when the cradle is in normal position, such as shown in full lines in Figs. 1 and 7. The cradle is formed from a number of axially spaced transverse ribs 20 in the form of girders which partially encircle the cradle as shown in Fig. 4. These girders or ribs are connected by circumferentially spaced longitudinally extending angles or equivalent structural members 20$^a$ and additionally, on the inside of the girders and secured thereto there is a lining 21 of plates extending the full length of the cradle across the bottom, up along the sides and partially over the top forming in effect a C-shaped or trough like body receptacle with a contracted delivery orifice 22 extending the full length of the cradle along the top thereof, or directly opposite the part having the track rails 19.

Surrounding the ends of the cradle are two large shrouded gears 23 which engage and roll over the lower shrouded racks 17. These gears and racks constitute the supporting means for the cradle and provide a true rolling action for the latter, as the cradle is moved to or from dumping position.

To actuate the cradle, I provide what may be termed a cradle turning carriage 24 which travels lengthwise of and between the upper girders 15 of the frame but which is preferably supported solely by the cradle and wholly independently of the top girders 15. This carriage which extends substantially the full length of the cradle is provided at its ends with flanged wheels 25 which engage at circumferentially spaced points shrouded portions of the large gears 23 surrounding the ends of the cradle. It is through these flanged wheels 25 that the carriage is supported on the cradle, the carriage always being on top the cradle irrespective of the position of the latter by reason of the cradle turning mechanism with which the carriage is provided. That is to say that position of the carriage relative to the cradle is at all times precisely as shown in Fig. 1.

The carriage is provided with an actuating motor 26, preferably an electric motor, which is connected through two sets of reduction gears to a shaft 27 extending the full length of the carriage and provided at its ends with actuating pinions 28 which engage the top points of the cradle gears 23 and the downwardly facing racks 18 carried on the lower sides of the upper frame girders 15.

The pitch of the teeth of the cradle gears 23 and of the stationary racks 18 is the same and since the pinions are between the fixed racks and the rolling gears, the movement of the pinions relative to or along the fixed horizontal racks is precisely the same as the movement of the cradle gears relative to the pinions. Hence, as the pinions are actuated in one direction or the other, the carriage will travel lengthwise of the frame girders and the cradle will be rolled over the lower racks 17 but the carriage will always remain directly on top of the cradle.

The carriage is preferably provided with an operator's station 29 and since the carriage is always on top of the cradle the operator is in the best possible position to observe and control the movements and position of the cradle. It is not essential however, that the operator have his station on the carriage for he may have his station at some other part of the machine, as for example at a fixed point.

It might be mentioned before passing to the description of other parts of the dumper that by the provision of the traveling cradle-turning carriage geared direct to the cradle and preferably supported on it, the best possible and almost perfect cradle control is obtained and since there is absent entirely the flexibility which obtains with rope or cable drives, the cradle can always be moved to the precise positions desired.

Preferably spring bumpers 30 are provided on the sides of the frame generally at the corners thereof, to stop the movement of the cradle when it reaches normal and full dumping positions.

Another novel feature of considerable importance in the dumper is the provision of top and side car clamps which are not only automatic in their car engaging and releasing action but automatically adapt themselves to cars of varying types and widths. These car clamps are preferably arranged in pairs on opposite sides of the interior of the cradle and they are preferably operated in pairs, for as will subsequently appear for the automatic operation of each pair of oppositely disposed clamps a counterweight and other instrumentalities common to both clamps are provided. In this instance three pairs of clamps are employed, though a greater or smaller number may be employed if desired. Furthermore as is obvious each clamp could be operated by a separate counterweight.

The clamps are all similar in construction and the description of one and its mode of operation or rather the operation of one pair will suffice for all. Each clamp is composed of two car-clamping members including a part 31 which engages the side of the car and may be termed the side clamp and a member 32 which engages the top of the car and may be termed the top clamp, the latter being received in and being guided for movement lengthwise of the former.

Each side clamp 31 is connected to the adjacent side of the cradle by a pair of parallel arms 33 pivoted to the clamp and cradle, these arms maintaining the clamp in its movement in parallelism with its normal position.

The top clamp which as before stated slides in the side clamp has pivotally connected to its lower end a link 34 which as will be seen particularly by reference to Fig. 4 is connected to the relatively long arm 35 of a bell-crank pivoted at 36 on the cradle structure while the relatively short arm 37 of the bell-crank is connected by an arm or link 38 to an arm 39 fixed to or integral with a cam 40 pivoted at 41 on the cradle structure at the central bottom portion thereof. The two cams 40 for the two clamps on opposite sides of the cradle (i. e., for the two clamps of the pair) are mounted side by side on the same pivot member 41 and co-operating with each pair of these cams to open or spread them to permit them to close, more or less like scissors blades is a roller 42 or a pair of coaxial rollers 42 mounted on the frame work of the dumper as shown in Figs. 1, 2, 3 and 4. It might be here stated that these rollers 42 are so positioned on the frame that just as the cradle is being restored to normal position the rollers are engaged by the pairs of cams and spread the latter so as to release from the car and as the cradle with a loaded car is being moved from normal position the cams close as they leave the roller permitting the clamps to be moved to car engaging position by the clamp counterweights.

In the construction shown in Fig. 1 the clamp counterweights 43 are arranged for vertical movement in counterweight shafts 44 which are located along one side of the dumper frame adjacent the cradle when the latter is in its normal position, this location of the counterweight being preferable with a dumper having a cradle which rolls from normal position in one direction only.

Each counterweight has a sheave 45 about which is looped a cable 46 which after passing around several sheaves to be referred to is connected to a pair of clamps so that the force of gravity acting on the weights at all times tends to pull the clamps to car engaging position.

Figures 8, 10, 11:
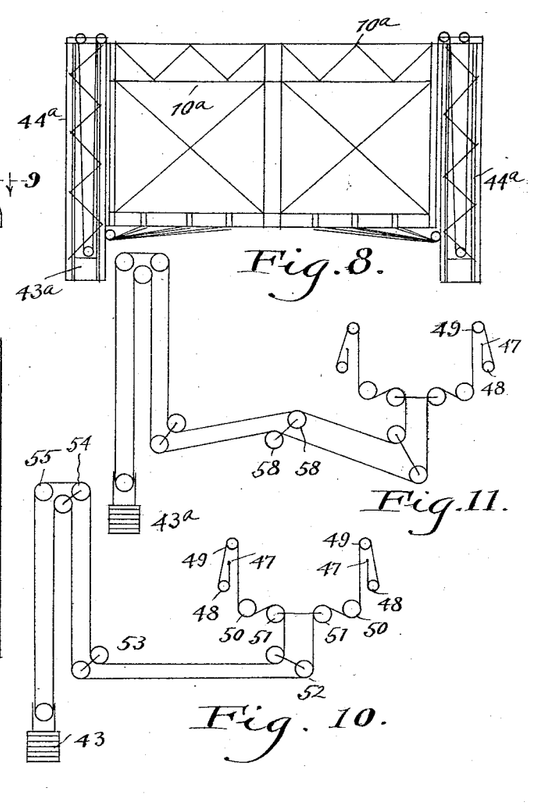
Figs. 10 and 11 are diagrammatic views illustrating car clamp cables, a car clamp counterweight and sheaves for the cables, Fig. 10 showing the preferred arrangement for a cradle which rolls in one direction only from normal position, Fig. 11 the arrangement for the cradle which rolls in both directions.

Referring now particularly to Figs. 4, 5 and 6 and to Fig. 10 which shows diagrammatically the manner in which the cable is reeved about the several sheaves, it will be seen that the ends of the cable are dead-ended on the side clamps as shown at 47. From the points of attachment to the side clamps the two parts of the cable extend downwardly about sheaves 48 carried by the cradle, then upwardly around sheaves 49 mounted in the upper ends of the top clamps 32. Then the two parts of the cable extend downwardly around sheaves 50 at the lower part of the cradle on opposite sides of the center, then they extend inwardly around sheaves 51 mounted coaxially at the lower central part of the cradle, these sheaves being shown in Figs. 1, 4 and 10, and portions being shown in Fig. 2. From the sheaves 51 the two parts of the cable extend down to and around a pair of coaxial sheaves 52 mounted in the main frame below the cradle when in its normal position; then the two parts of the cable pass lengthwise of the frame along the bottom thereof to and around a pair of coaxial sheaves 53, also supported by the frame, then up alongside the counterweight shafts around a pair of coaxial sheaves 54 at the top of the frame and at the top of the counterweight shafts and then the two parts of the cable pass to the counterweight sheave 45, one part of the cable first passing around a sheave 55 as clearly indicated in Figs. 1 and 10.

The clamps are automatically operated in the following manner. In this description let it first be assumed that the cradle is out of normal position and that it is being restored to normal position after having dumped a car. At this time the side clamps and top clamps are held firmly against the sides and top of the car since the pull of the counterweights is directly on the clamps. Also, at this time the two cams 40 corresponding to each pair of clamps are partially closed as shown in the dotted line position of the cradle in Fig. 1. Just before the cradle reaches normal or car receiving position the final rolling movement of the cradle brings the pairs of cams 40 onto the stationary rollers 42 whereupon the rollers spread the cams to the position shown in Fig. 4. This movement of the cams through the links 38, bell crank arms 35 and 37 and links 34 first elevate the top clamps 32 which slide vertically in the side clamps 31 until shoulders indicated at 56 (see Fig. 5) on the top clamps engage corresponding shoulders 57 on the side clamps whereupon further relative movement between the top clamps and the side clamps ceases and the further movement of the cams 40 by their continued engagement with the rollers 42 swings the side clamps together with the top clamps up and away from the sides of the car to the position shown in Fig. 4. The clamps are now entirely clear of the car and it can be removed from the cradle.

When a loaded car has been run on to the cradle and the cradle starts its rolling motion to dumping position, as the cams 40 leave the rollers 42, the cams again fold together and the clamps are pulled to car engaging position by the counterweights. In this movement of the clamps the side and top clamping members move as a unit until the side clamps engage the sides of the car and then the top clamps are pulled downward until they engage the top of the car. The car is thus held onto the track by the clamps while the cradle is being rolled to dumping position and in fact until it is rolled back to normal position when the cams 40 carried by the cradle engage the rollers carried by the frame and shift the clamps away from the car. It will be understood from the above description considered in connection with the drawings that in all positions of the cradle except when it is at and adjacent its normal car receiving position, the car clamps are held down tightly against the top and sides of the car on the cradle by the direct action of the counterweights and of the counterweight cables connected to the clamps. It will be understood also, that it is only when the cradle is in a position such that the cams 40 engage the rollers 42, that the clamps are lifted clear of the car, this occurring only when the cradle is in normal position, also at the start of the rolling motion from normal position, and also on the return movement of the cradle just before the cradle reaches normal position.

I believe it is entirely novel with me to provide in a dumper having a rolling cradle as described, car clamps which are automatically actuated to clamp the car at the start of the rolling motion from normal position and to release the car at the end of the return rolling movement and this feature among others already described I intend to claim broadly irrespective of the details of the clamps and of the mechanism by which they are actuated.

Figure 9:
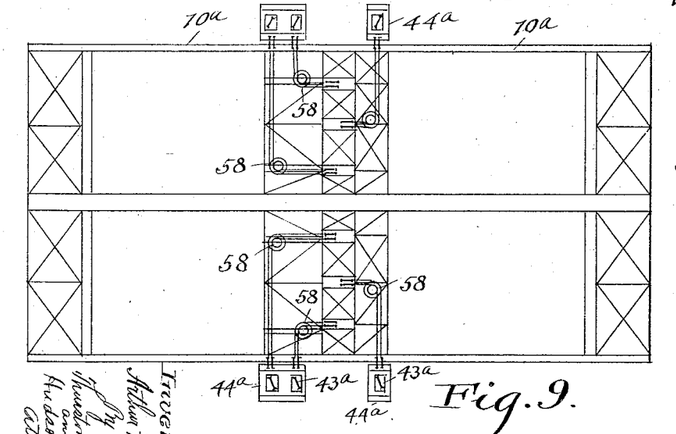
Figure 12:
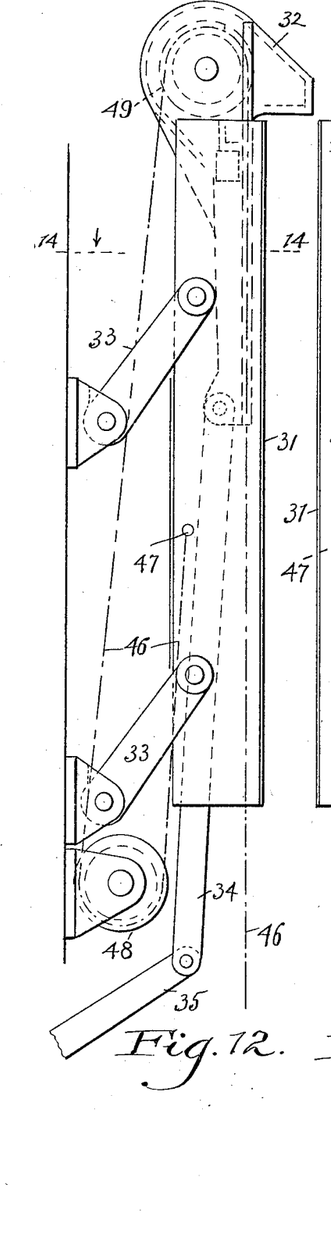
Fig. 12 is a side view of one of the rail clamps substantially as shown in Fig. 5, but on a larger scale.
Figures 13, 14, 15:
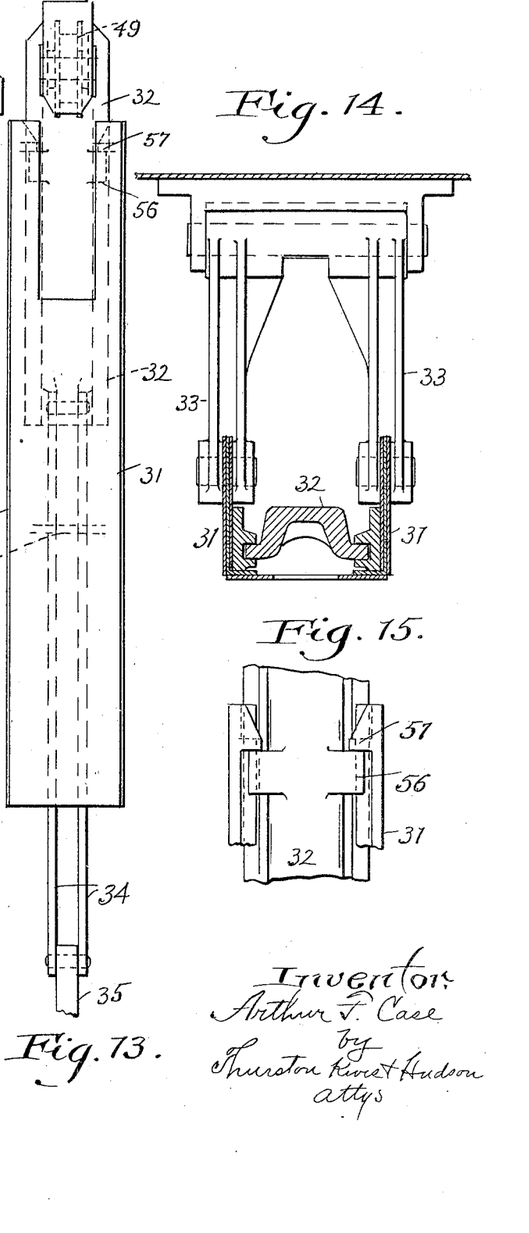
Fig. 13 is an inside view of the same.
Fig. 14 is a transverse section substantially along the line 14—14 of Fig. 12 looking in the direction indicated by the arrow.
Fig. 15 is a fragmentary outside view of the clamp of Fig. 12, the portion of the clamp here shown being near the top of the clamp.

When the cradle is designed to be rolled over in one direction only as in Fig. 1, it is desirable that the counterweights be arranged for vertical movement at one side of the dumper frame as explained and in a dumper whose cradle is designed to be rolled in both directions from normal condition a similar arrangement is possible but not preferable for when the car and cradle are rolled to one side of the central position, the contents of the car would be dumped on to the portions of the counterweight cables which extend along the lower part of the frame. This would not be a desirable condition and I therefore prefer in a dumper whose cradle rolls in both directions to normal position that the counterweights and counterweight shafts be arranged at one or both ends of the frame instead of along one side thereof, at one or both sides of the approached track, for example, as shown conventionally in Figs. 7, 8, and 9. In these figures, I have shown a two unit dumper, i. e., a dumper having a frame designated $10^a$ and adapted to accommodate two cradles. In this instance the counterweights are indicated at $43^a$ and the counterweight shafts at $44^a$ and the latter being arranged at both ends of the two unit frame as clearly shown in Fig. 9 at both sides of the center, i. e., on both sides of the approached track (not shown), the counterweights and counterweight shafts for one cradle being at one end of the frame and those for the other cradle being at the opposite end of the frame.

This positioning of the counterweights requires for each pair of clamps simply the addition of an extra pair of sheaves 58 over the arrangement and positioning of the sheaves of Fig. 10. This extra pair of sheaves being deflecting sheaves located at the lower part of the frame a short distance from the sheaves 52 which are directly beneath the cradle when in normal position. This will be readily understood by reference to Figs. 9 and 11. It will be seen therefore that the car or cars can be dumped to either side of the center position of the cradle and that regardless of the direction in which the cradle is rolled the counterweight cables are entirely clear of the coal or other material being dumped from the car.

In a dumper which dumps on both sides of the normal position the frame is extended to provide runways on both sides of the center position of the cradle and the upper and lower racks 17 and 18 are extended so that the turning carriage may roll the cradle from center position to either end of the frame.

When the dumper is built in two or more units, i. e., to accommodate two or more cradles, the cradles will be arranged precisely end to end and they will be rolled simultaneously, though the cradles are preferably entirely separate and distinct from each other structurally and are formed or constructed and operated precisely as in a single unit dumper having a cradle designed to accommodate a single car.

In actuating the cradles of a multiple dumper, separate actuating turning carriages will be provided, each supported on its cradle as already explained and each having its own cradle turning motor. I prefer, however, in a multiple unit dumper that the operating shafts 27 be coupled together so as to constitute in effect one shaft which extends over the two or more cradles. In Fig. 2 where I show one complete cradle and a portion of a second cradle arranged adjacent to it, the coupling between the two operating shafts is indicated at 59. In a dumper of this kind, i. e., in a multiple unit dumper the motors 26 will be operated synchronously from a single point of control, the same switching mechanism controlling the two or more motors.

It will be obvious that in a multiple unit dumper having cradles each adapted to accommodate one car with the cradles structurally independent of each other and each supported independently of the other or others a plurality of cars can be handled at the same time without subjecting any part of the cradles to the bending stresses which would exist if a single long cradle were employed instead of the two or more relatively short cradles constructed and supported independently of one another.

While I have shown the preferred construction of my improved dumper with the cradle adapted to be rolled in one direction from normal position and also with the cradle adapted to be rolled in both directions from normal position and while I have explained the manner in which my invention may be embodied in a multiple unit dumper adapted to accommodate a plurality of cradles and to operate them simultaneously it will be obvious that my invention may be embodied in a dumper having a single cradle which may accommodate a single car as herein illustrated or may be made long enough to accommodate more than one car; furthermore, the details of many of the parts involved in the construction of the frame and the cradle and the operating mechanism for the cradle, the car clamps and the operating mechanism therefor may be varied without departing from the broad features of my invention herein disclosed and I therefore desire not to be confined to the precise details shown or described but aim in my claims to cover all modifications which do not involve a departure from the spirit and scope of my invention in its broadest aspects.

Having described my invention, I claim—

1. A car dumper comprising a frame having a runway, a cradle adapted to receive a car and to be rolled over said runway and a turning carriage adapted to travel along the frame and operatively connected to the cradle to impart a rolling motion thereto.

2. A car dumper comprising a frame, a cradle adapted to receive a car and supported by the frame for rolling motion thereon, a gear surrounding the cradle and a traveling cradle-turning carriage having a source of power connected to said gear.

3. A car dumper comprising a frame having a pair of spaced racks at the lower part thereof, a cradle adapted to receive a car and provided with gears adapted to roll over said racks, racks at the upper part of the frame above the first mentioned racks and a turning carriage above the cradle having a power shaft with pinions engaging said gears of the cradle and said last mentioned racks of the frame.

4. A car dumper comprising a frame having a runway, a cradle supported by the frame for rolling motion over said runway, a gear surrounding the cradle a rack supported by the frame and extending along the runway and means for rolling the cradle comprising a traveling member having a pinion engaging said gear and said rack.

5. A car dumper comprising a frame having a runway, a cradle supported by the frame for rolling motion over said runway, and means for actuating and controlling said cradle comprising gears surrounding cradle and a traveling carriage having a power shaft with pinions engaging said gears.

6. A car dumper comprising a frame, a rolling car receiving cradle supported by the frame, a cradle turning carriage resting on the cradle and means for maintaining operative relation between the cradle and carriage.

7. A car dumper comprising a frame, a rolling car receiving cradle supported thereby, a carriage resting on the top of said cradle and operatively connected thereto to impart a rolling motion to the same and means for maintaining operative relation between the cradle and carriage.

8. A car dumper comprising a frame, a rolling car receiving cradle supported thereby, a gear surrounding the cradle a carriage resting on the cradle, and provided with a power operated gear engaging the gear of the cradle and means for maintaining the gears in operative relation.

9. A car dumper comprising a frame, a rolling car receiving cradle supported thereby a cradle-rolling carriage resting on the cradle and provided with a power operated shaft geared to the cradle and means for maintaining operative relation between the cradle and carriage.

10. A car dumper comprising a frame, a rolling car receiving cradle supported thereby, gears surrounding the cradle, and a carriage resting on the cradle and having a power operated shaft extending lengthwise of the cradle and having gears engaging the gears of the cradle and means for maintaining the gears of the cradle and carriage in operative relation.

11. A car dumper comprising a frame with a runway, a cradle supported on the frame and adapted to roll over said runway a rack supported by the frame above the cradle a gear surrounding the cradle and adapted to roll therewith, and a cradle-rolling carriage supported on the cradle and having an actuating pinion arranged between and engaging said rack of the frame and said gear of the cradle.

12. A car dumper comprising a frame with a runway, a rolling cradle adapted to receive a car and supported by the frame for rolling motion over the runway, gears surrounding the ends of the cradle, racks supported by the frame above said gears, a carriage supported on the cradle and provided with a power operating shaft extending lengthwise thereof above the same, said shaft having actuating pinions between and engaging said racks of the frame and gears of the cradle.

13. A car dumper comprising a frame having a runway, a cradle adapted to be rolled laterally over said runway and having car receiving means which turns with the cradle as it rolls over the runway, said cradle having car clamps which automatically engage and release the car supported by the cradle.

14. A car dumper comprising a frame having a runway for a rolling cradle, a cradle adapted to receive a car and to be rolled over said runway and having car receiving means which turns therewith during the rolling movement, car clamps carried by the cradle, and means for causing said clamps to automatically engage the car at the start of the rolling motion from normal position and to automatically release the car adjacent the end of the rolling motion back to normal position.

15. A car dumper comprising a frame having a runway for a rolling car receiving cradle, a cradle adapted to be rolled over said runway, car clamps carried by the cradle and adapted to engage a car supported on the cradle near the beginning of the turning movement of the car, said clamps comprising parts adapted to move to and from car engaging position, and co-operating means carried by the frame and cradle for shifting the clamps due to the motion of the cradle.

16. A car dumper comprising a frame having a track-way, a cradle adapted to receive a car and to be rolled over said trackway, automatic car clamps carried by the cradle and comprising parts adapted to move to and from car engaging position, and means for causing the clamps to automatically engage the car at the start of the rolling motion of the cradle along said trackway, and counterweights acting through the clamps for holding car on the cradle.

17. In a car dumper, a frame having a track-way, a cradle supported by the frame and adapted to be rolled along the trackway, movable car clamps carried by the cradle, counterweights for holding the clamps in car engaging position, and means for causing the clamps to be automatically moved from car engaging position as the cradle is being rolled back to normal position after having dumped the car.

18. In a car dumper, a frame, a rolling cradle supported by the frame and adapted to receive a car when in a given position, the frame having a track-way for the cradle extending in both directions from the car receiving position of the cradle, car clamps carried by the cradle, and means for causing the clamps to automatically engage the car in the cradle when the cradle is moved in either direction from normal position.

19. In a car dumper, a frame, a rolling cradle supported by the frame and adapted to receive a car when in a given position with respect to the frame, the frame having a track-way for the cradle extending on both sides of the car receiving position of the cradle and said dumper having means for positively rolling the cradle over the track-way to and from car receiving position, car clamps carried by the cradle, and means for causing the clamps to automatically engage the car in the cradle when the cradle is moved in either direction from normal position.

20. A multiple unit car dumper comprising a frame having a plurality of runways and a plurality of car receiving cradles arranged end to end and adapted to be rolled over said runways and means for simultaneously operating the cradles.

21. In a car dumper, a multiple unit frame, each unit of the frame having a runway, a plurality of cradles arranged end to end supported by the frame for simultaneous rolling motion to and from car receiving position and means for simultaneously operating all the cradles.

22. In a car dumper, a frame having a plurality of runways and a plurality of cradles arranged end to end and supported by the frame for rolling motion to and from car receiving position and a cradle operating mechanism for simultaneously shifting the cradles.

In testimony whereof, I hereunto affix my signature.

ARTHUR F. CASE.